(12) United States Patent
Hay et al.

(10) Patent No.: US 6,823,447 B2
(45) Date of Patent: Nov. 23, 2004

(54) SOFTWARE HINT TO IMPROVE THE BRANCH TARGET PREDICTION ACCURACY

(75) Inventors: Robert William Hay, Austin, TX (US); Balaram Sinharoy, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 679 days.

(21) Appl. No.: 09/798,166

(22) Filed: Mar. 1, 2001

(65) Prior Publication Data

US 2002/0157000 A1 Oct. 24, 2002

(51) Int. Cl.[7] .............................................. G06F 9/00
(52) U.S. Cl. ...................................... 712/239; 712/237
(58) Field of Search .............................. 712/239, 237, 712/238, 231, 225, 220, 41

(56) References Cited

U.S. PATENT DOCUMENTS

| | | | |
|---|---|---|---|
| 5,136,696 A | * 8/1992 | Beckwith et al. | 712/240 |
| 5,542,109 A | * 7/1996 | Blomgren et al. | 712/234 |
| 5,655,115 A | * 8/1997 | Shen et al. | 712/239 |
| 5,721,855 A | * 2/1998 | Hinton et al. | 712/218 |
| 5,857,104 A | * 1/1999 | Natarjan et al. | 717/158 |
| 5,887,159 A | * 3/1999 | Burrows | 712/226 |
| 6,360,297 B1 | * 3/2002 | Arimilli et al. | 711/122 |
| 6,446,197 B1 | * 9/2002 | Krishnan et al. | 712/237 |

OTHER PUBLICATIONS

Chen et al. "Analysis of Branch Prediction via Data Compression", Proceedings of the 7th international Conference on Architectural Support fpr for Programming Languages and Operating Systems, vol. 31, 30 Issue 9, 5, Sep. 1996.*

* cited by examiner

*Primary Examiner*—Henry W. H. Tsai
(74) *Attorney, Agent, or Firm*—Richard F. Frankeny; Winstead Seachrest & Minick P.C.; Mark E. McBurney

(57) ABSTRACT

A field is defined in branch instructions which is interpreted by software as "Hint" bits and these bits are used to signal the processor of special circumstances that may arise when doing speculative branch instruction execution to enable better branch address prediction accuracy and a reduction in link stack corruption which improves overall execution times. A programmer or compiler determines if a branch instruction usage fits in the context for a Hint action. If so, the compiler or programmer, using assembly/machine language, sets Hint bits in the branch instruction when it is compiled. If the branch is later speculatively executed, the processor decodes the Hint bits and executes and a hardware action corresponding the decode of the Hint bits. These Hints include four specific Hint actions, however, the field reserved for Hint bits is five bit wide reserving up to thirty-two specific Hint cases may be specified. These Hint cases (or Hint bits) may be interpreted differently for each type of branch instruction supported.

15 Claims, 6 Drawing Sheets

SOFTWARE HINT TO IMPROVE THE BRANCH TARGET PREDICTION ACCURACY

TECHNICAL FIELD

The present invention relates in general to methods for predicting branch target addresses in speculative instruction execution.

BACKGROUND INFORMATION

In some computer software, a "branch and link" instruction is executed to make a subroutine call. When a "branch and link" instruction executes, the address of the next instruction (where to return after the execution oft he branch) is placed in the link register and the execution starts from the target address of the branch instruction (the execution may continue on the fall through path, if the branch is a not-taken conditional branch). To return from the subroutine, a branch to link register (bclr) instruction is executed. This instruction has two forms, branch to link register (bclr) and branch to link register and link (bclrl). In this disclosure, these two forms are designated with the shortcut bclr[l] when both instructions are applicable. For nested sub-routine calls, the content of the link register is saved before making a new sub-routine call and restored after returning from that sub-routine.

Fetching an instruction precedes its execution by several machine cycles in high speed deeply pipelined microprocessors. Because of this, the content of the link register that should be used to start instruction fetching after a bclr[l] instruction has been found (and predicted taken) in the predicted path may not yet have the proper target address. Therefore, the content of the link register has to be predicted to keep instruction fetching far ahead of their execution.

If the link register is used only for subroutine calls and returns, a simple prediction mechanism may use a stack of link register values, called a "link stack". When a bclr[l] instruction is found in the predicted path (and the predicted path is taken), the address of the next instruction is pushed (added in a specific order) into the link stack. For example the link stack pointer (address of link stack entry) is incremented by one on a "push" operation. When a bclr[l] instruction is found in the predicted path (and predicted path is taken), the last address pushed into the link stack is popped (read from the stack in a specific order) and used as the new address to start instruction fetching. During a "pop", the link stack pointer is decremented by one. This approach should work perfectly, except for the following cases which may leave the link stack corrupted:

1. In the C programming language, a "long jump" instruction (usually used when an error case is detected) can cause the flow of instructions to skip several "subroutine returns" from nested subroutine calls.
2. In many compilers, an optimization called "tail recursion" is used. A recursive subroutine call in which the last statement is a call to itself is called a "tail recursion". For example, let a subroutine A call subroutine B where subroutine B is a tail recursive subroutine. Then let B call itself several times before reaching the leaf subroutine call. When the leaf subroutine returns, it does not have to go through the nested returns (through the chain of subroutine calls to B itself), rather, it can directly return to the instruction in A that follows the first call to B.
3. In many computer architectures (e.g., PowerPC), if the distance (number of instructions) between a branch instruction and its target address is above a certain limit, instructions such as bclr[l] or "branch to count register" (bcctr) instruction are used and the target address is stored in a register such as a Link Register (LR) or a Count Register (CTR) before the branch instruction executes. In this disclosure, "branch to count register" and "branch to count register and link" may be designated as bcctr[l]. The bclr[l] instruction is sometimes used for reasons other than subroutine returns, for example, in some compilers it is used to implement the switch statement (in C programming language) and computed GOTO (in Fortran). For such use of the bclr[l] instruction, the link register is updated using a "move to link register" (mtlr) instruction.

The branch to count register instruction is used in some compilers for generating code for switch statements and computed GoTo statements. It is also used in "glue code" for the target address of an indirect subroutine call or for the target address to a subroutine call when the calling subroutine and the subsequent called subroutine do not belong to the same compilation module.

In many cases, the target address of the bcctr[l] instruction is highly predictable. For example, studies have shown that the indirect subroutine calls in many object-oriented programs do call the same subroutine most of the time, making the address highly predictable by remembering the target address used by the instruction in its last execution. In some processors, the target address is stored in an area called "Count Cache". Count Cache is a small cache memory used in the prediction of target addresses for bcctr[l] instructions.

Branch instructions are used extensively in computer code for a variety of software functions. Since these branch instructions are key to speculative instruction execution, the accuracy of branch prediction is very important to improving instruction execution time. There has been much work done to improve branch direction prediction, however not much work has been done to improve branch target prediction. Therefore there is a need for a method for improving branch target prediction accuracy for modern computer systems.

SUMMARY OF THE INVENTION

A bit field in branch instructions is reserved for Hint bits which are added to the branch instruction by the programmer or the compiler depending on the use (context) of the branch instruction in software code. When the branch instruction is later speculatively executed, these Hint bits are decoded and used to direct the hardware as to the source of information and actions to take to improve the accuracy of the speculative branch instruction execution. A branch instruction may have multiple uses in a software routine, and Hint bits are only used in those branch instructions where the programmer or the compiler knows that the Hint bits and the corresponding hardware actions will improve instruction execution. The Hint bits are used in branch to link register (bclr) and branch to count register (bcctr) instructions; however, Hint bits may be used in other branch instructions and still be within the scope of the present invention. The hardware actions minimize link stack corruption and improve execution time by providing better branch prediction.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
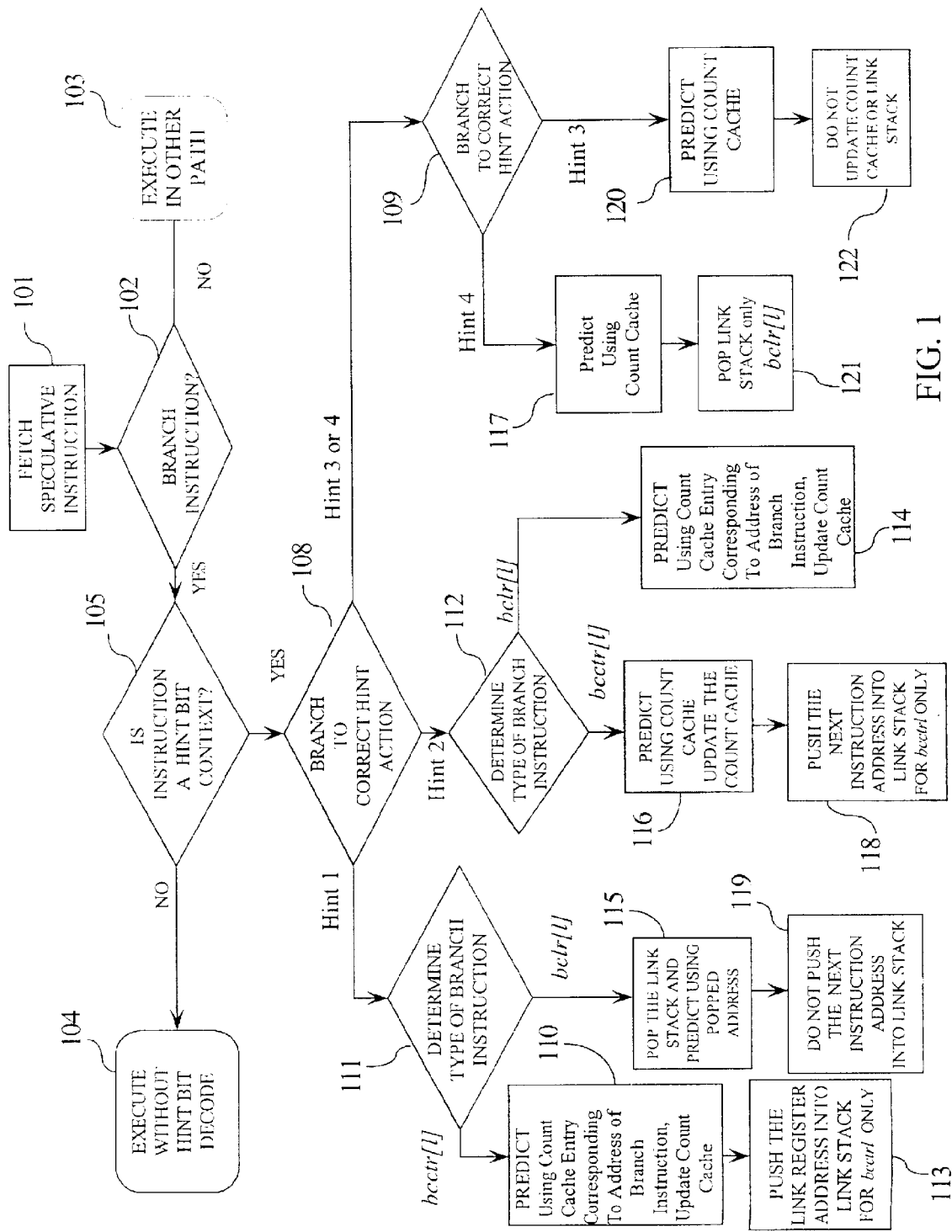
FIG. 1 illustrates method steps in embodiments of the present invention.

In the following description, numerous specific details are set forth such as specific word or byte lengths, etc. to provide a thorough understanding of the present invention. However, it will be obvious to those skilled in the art that the present invention maybe practiced without such specific details. In other instances, well-known elements have been shown in block diagram form in order not to obscure the present invention in unnecessary detail. For the most part, details and the like may have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements may be designated by the same reference numerals through the several views.

The present invention discloses a way for software executing on a system employing embodiments of the present invention to provide appropriate "Hints" to the processor to indicate whether the target address of a branch instruction is predictable or not and, if it is predictable, which prediction mechanism (link stack or Count Cache) should be used. This may be achieved by setting appropriate bits in a Hint bit field in the branch instruction. The Count Cache is a small cache that is direct mapped and with no tags.

Figure 6:
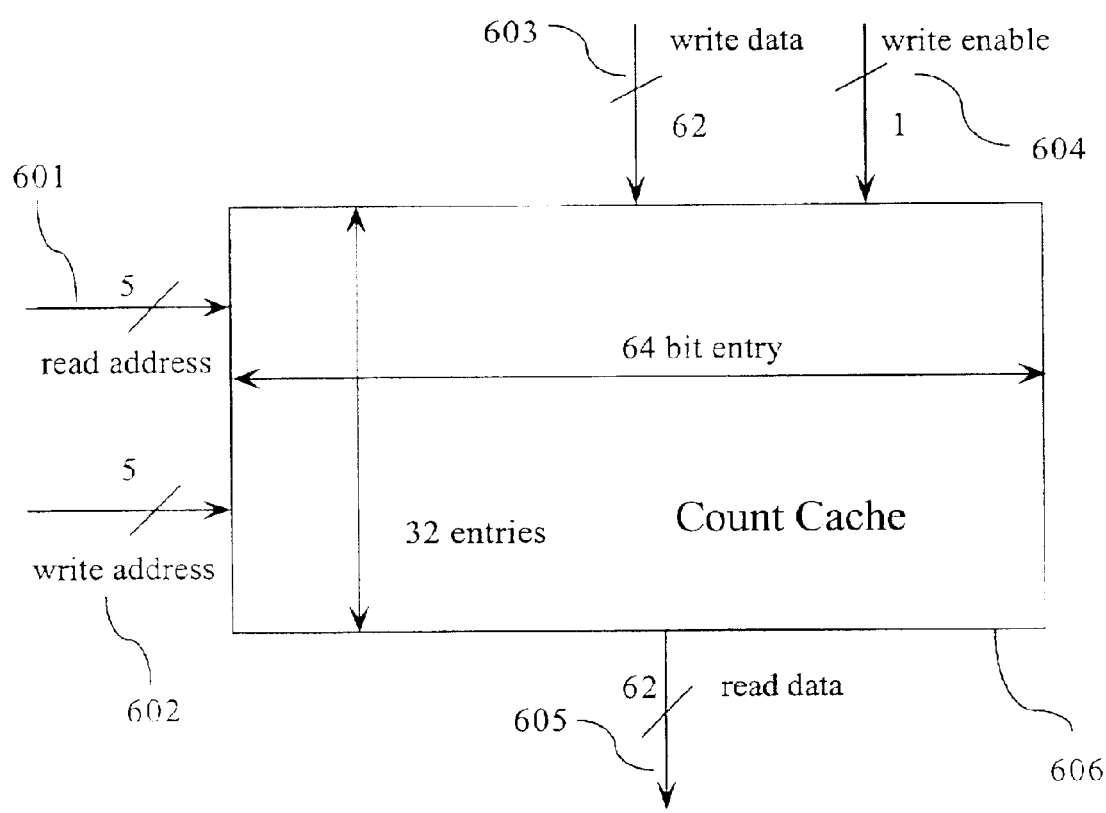
FIG. 6 is a block diagram of a Count Cache which may be used in embodiments of the present invention.

FIG. 6 is a block diagram of a Count Cache 606 with thirty-two 64 bit entries which may be used in embodiments of the present invention. Count Cache 606 may be contained in a Branch Unit 406 (see FIG. 4) where hardware actions in response to Hint bit decodes may be executed. Write data 603 may be entered into the Count Cache 606 location determined by a write address 602. Write enable 604 determines whether data is read out or written into Count Cache 606. Read data 605 is outputted from read address 601.

The algorithm for Count Cache 606 is simple. When a bcctr[l] instruction is executed, the address of the bcctr[l] instruction and the target of the bcctr[l] instruction are sent to the Count Cache 606. The target address of the bcctr[l] instruction is written into the Count Cache 606 location addressed by the instruction address of the bcctr[l] instruction. For example, the 32 entry Count Cache 606 may be addressed (for reads as well as writes) by using bits 54–58 of the address of the bcctr[l] instruction. The address of any instruction is 64 bits, but in some architectures (e.g., reduced instruction set computer (RISC)) the last two bits are always logic "00" so only 62 bits are needed.

To reduce the performance degradation due to the corruption of the link stack (as described in the background), embodiments of the present invention enable a programmer or compiler to provide appropriate Hints to the processor by properly setting the Hint bits in the branch instruction. For example, let the Link Stack 200 (see FIG. 2) at a given time contain entries as follows where "B" is the top of the Link Stack 200.

| Entry (1) | B |
| Entry (2) | A |

If a branch to link register (bclr) is fetched for a subroutine call and the address of the instruction after the bclr is "C", the address "C" gets pushed into the Link Stack 200 and the new Link Stack 200 has the following configuration:

| Entry (1) | C |
| Entry (2) | B |
| Entry (3) | A |

If a branch to link register (bclr[l]) instruction (which is not for a subroutine call) is fetched subsequently, then the Link Stack 200 is popped and the address "C" is predicted as the target address of the bclr[l] instruction and the Link Stack 200 reverts to the following:

| Entry (1) | B |
| Entry (2) | A |

However, since this bclr[l] is not for a real subroutine return, the target prediction is highly likely to be incorrect. If, however, another bclr[l] instruction is now fetched (for a real subroutine return), then the address "B" (instead of "C") is popped from the stack. This target address is incorrect. Since the first bclr[l] instruction was not for a real subroutine return, the Link Stack 200 gets corrupted. This corruption could have been prevented if there was a hint (supplied by the programmer or the compiler) in the first bclr[l] instruction indicating that this is not a real subroutine return and the processor did not pop the Link Stack 200 based on it. In that case, the second bclr[l] would have found "C" at the top of the Link Stack 200 and its target prediction would have been correct.

When a bclr[l] instruction is used for purposes other than a subroutine return, the software will set the bits to indicate "do not pop the link stack". In addition, other embodiments of the present invention provide a Hint bit in the bclr[l] instruction to indicate that a recursive call to itself should not push the next instruction address into the Link Stack 200. This enables the bclr[l] instruction (in a subroutine B), at the end of the recursion, to pop the Link Stack 200 and predict the correct target address in a subroutine A. This will also prevent the Link Stack 200 from being corrupted or being overflowed and allow the Link Stack 200 to contain the history of calls made prior to the recursive call.

Performance analysis has shown that the target address of a bcctr[l] instruction is often repetitive and can be predicted if the address is saved in a cache from an earlier execution of the bcctr[l] instruction. This is also true for some of the bclr[l] instructions which do not correspond to a subroutine return (hence cannot be predicted using the Link Stack 200). However, not all such branches are predictable using the Count Cache 606. By setting the Hint bits appropriately, software communicates to the hardware as to whether the target address for such branches are predictable using the Count Cache 606 or not. Since target addresses of non-predictable branches will not be saved in the Count Cache 606, the Count Cache corruption is reduced and Count Cache performance is improved.

Embodiments of the present invention have established a five bit field called BH for the bcctr[l] and the bcclr[l] instructions and presently use the BH field only for providing "Hints". All of the bits do not have a definition but reserve the possibility of thirty-two "Hints".

Hint 1:(00) Branch is predictable using the Link Stack 200 for bclr[l] instruction and using Count Cache 606 for bcctr[l] instruction.

Hardware actions:
a) For bclr[l] instructions, pop the Link Stack 200 and predict using the popped address.
b) For bcctr[l] instructions, predict using the Count Cache 606 and update the Count Cache 606.
c) For bclrl instructions, do not push next instruction address into the Link Stack 200.
d) For bcctrl instructions, do push link register address into the Link Stack 200.

Hint 2:(01) For bclr[l] instructions, the target address is predictable using Count Cache 606.

Hardware actions:
a) For both bclr[l] and bcctr[l], predict using the Count Cache address.
b) Update the Count Cache 606 for both bclr[l] and bcctr[l] (default case for bcctr).
c) For bcctrl, push the link register address value into the Link Stack 200.

Hint 3:(11) Target address is unpredictable.

Hardware actions:
a) Predict using Count Cache 606 (default case).
b) Do not update the Count Cache 606 or Link Stack 200. Except for a bcctrl, push the next instruction address in the Link Stack 200.

Hint 4:(10) Reserved

Hardware actions:
a) Pop Link Stack 200 for bclr[l] instruction (default case).
b) Predict the Count Cache 606 or Link Stack 200.

Embodiments of the present invention provide a way for the compiler or a programmer to provide appropriate Hints to the processor to indicate whether the target address of a branch instruction is predictable or not and, if predictable, which prediction mechanism (the Link Stack 200 or the Count Cache 606) should be used. This is achieved by setting appropriate Hint bits in the branch instruction. Embodiments of the present invention provide better target address prediction by using the prediction mechanism hardware more efficiently and reducing corruption of the Link Stack 200 and the Count Cache 606.

To reduce the performance degradation due to the corruption of the Link Stack 200, embodiments of the present invention have the software provide appropriate Hints to the processor by properly setting the Hint bits in the branch instruction. When a branch to link register instruction is used for purposes other than a subroutine return, the software will set the Hint bits to indicate "do not pop the link stack".

Embodiments of the present invention provide a Hint bit in the branch to link register and link instruction to indicate that recursive calls to itself should not push the next instruction address in the Link Stack 200. This will enable the branch to link register instruction (in subroutine B) at the end of the recursion to pop the Link Stack 200 and predict the correct target address in subroutine A. This will also enable the Link Stack 200 from being corrupted or overflowed and contain the history for the calls made prior to the recursive calls.

Performance analysis also shows that the target address of a branch to count register instruction is often repetitive and can be predicted if the address is saved in a cache from an earlier execution of it. This is also true for some of the branch to link register instructions which do not correspond to a subroutine return (hence cannot be predicted using the Link Stack 200. However, not all such branches are predictable using the Count Cache 606. By setting the Hint bits appropriately, software communicates to the hardware whether the target address for such branches are predictable using the Count Cache 606. Since target addresses of non-predictable branches will not be saved in the Count Cache 606, this reduces the Count Cache corruption and improves its performance.

Figure 4:
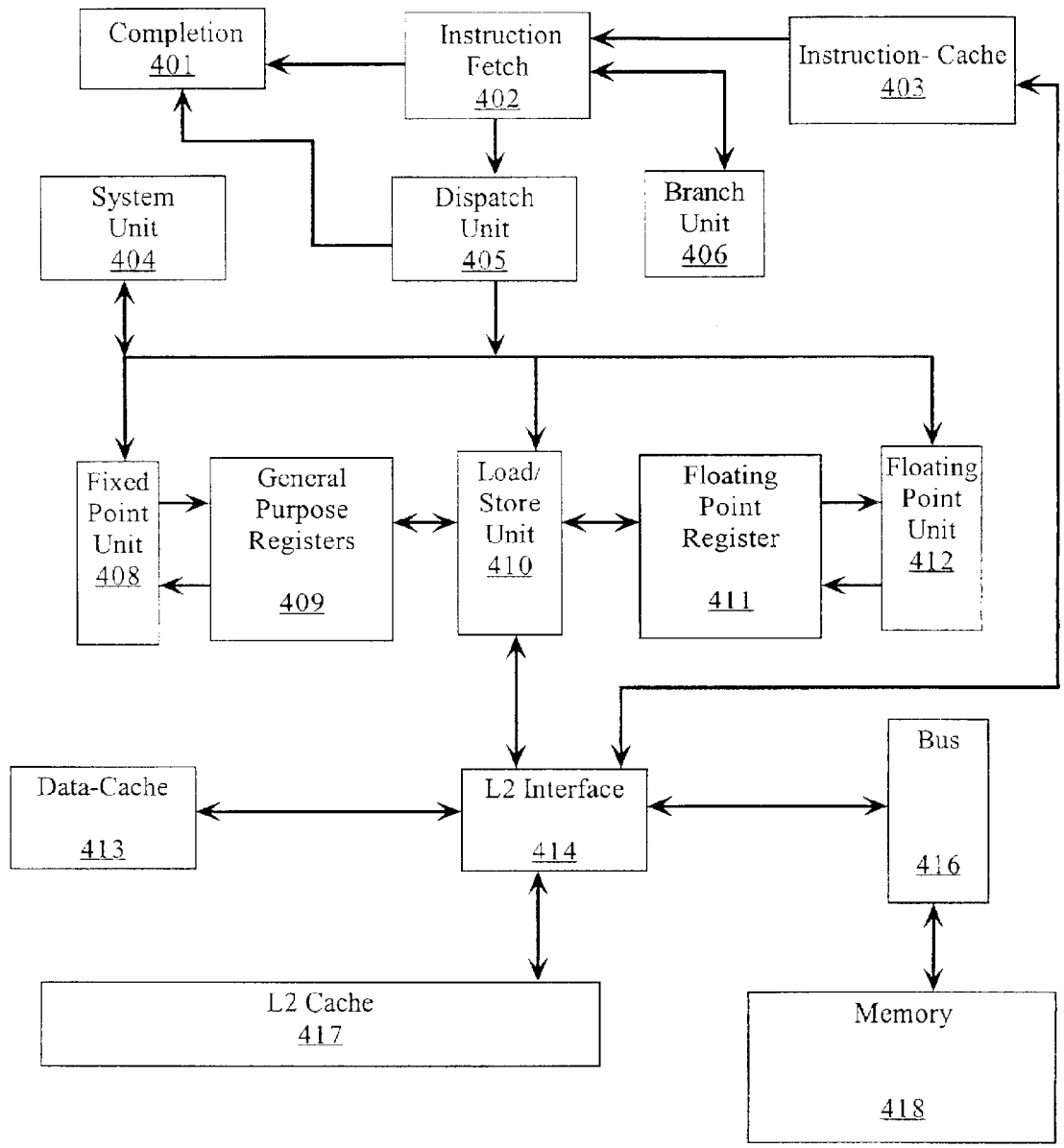
FIG. 4 is a block diagram of logic units in a processor which may include hardware which executes actions based on the decode of the Hint bits according to embodiments of the present invention.

FIG. 4 is a block diagram of logic units that may be present in a processor. A memory unit 418 is interfaced with a bus unit 416 to a L2 cache interface 414. L2 Cache Interface 414 controls the flow of information between memory 418, L2 cache 417, Data-Cache 413, Load/Store unit 410 and Instruction-Cache 403. Instructions may be fetched speculatively according to embodiments of the present invention with Instruction Fetch unit 402. Branch instructions are decoded in Branch Unit 406. Branch Unit 406 may decode Hint bits in branch instructions and take hardware actions according to embodiments of the present invention. The circuits used to execute the hardware actions may be located in Branch Unit 406. Other instructions may be dispatched with Dispatch Unit 405 to Load/Store Unit 410, Floating Point Unit (FPU) 412 and Fixed Point Unit (FXU) 408. FXU 408 uses general purpose registers (GPR) 409 to store intermediate results. GPR 409 is also available for use by Load/Store unit 410. FPU 412 uses Floating Point Registers (FPR) 411 to store intermediate results. FPR 410 is also available to Load/Store Unit 410. System Unit 404 accesses FXU 408, Load/Store 410 and FPU 412. Dispatch Unit 405 signals completion of instruction execution to Completion Unit 401.

FIG. 1 is a flow diagram of hardware actions that may be taken by a decode of Hint bits in a Branch Unit 406 (see FIG. 4) according to embodiments of the present invention. In step 101, an instruction is fetched speculatively. In step 102, a test is done to determine if the instruction is a branch instruction. If the result of the test in step 102 is NO, then the instruction is executed in another path in step 103. If the result of the test in step 102 is YES, then a branch is initiated to step 105 where a test is done to determine if the branch instruction is a Hint bit context branch instruction. If the result of the test in step 105 is NO, then the branch is executed without Hint bit decode in step 104. If the result in step 105 is YES, then a test is done in step 108 to determine the proper Hint action. If the action in step 108 is a Hint 1 action, then step 111 is executed where a test is done to determine the type for the Branch Instruction. If the Branch instruction is a bcctr[l] instruction, then in step 110 the prediction is made using the Count Cache entry corresponding to the address of the branch instruction and the Count Cache 606 is updated when the branch is executed. The next instruction address is then pushed into the Link Stack 200 in step 113. Link Stack 200 may be contained in Branch Unit 406 (see FIG. 4). If the instruction in step 111 is bclr[1], then in step 115 an address is "Popped" from the Link Stack 200 and the "Popped" address is used for the prediction. In step 119, the next instruction address is not pushed into the Link Stack 200. If the correct Hint action in step 108 is Hint 2, then a test is executed in step 112 to determine the type of branch instruction. If the branch path is bclr[1], then prediction is done in step 114 using the Count Cache entry corresponding to the address of the branch instruction and the Count Cache 606 is updated. If the Branch Path in step 112 is bcctr[1], then prediction is done in step 116 using the Count Cache 606 and the Count Cache 606 is updated and the next instruction address is pushed into the Link Stack 200 in step 118. If the branch instruction in step 112 is bclr[1], then predict using the Count Cache entry corresponding to the address of the branch instruction and update the Count Cache 606. If the Branch Path in step 108 is other than Hint 1 or Hint 2, then a test for the correct Hint action is done in step 109. If the correct Hint action is bclr[1] only, then prediction is done using the Count Cache 606 in step 117 and the Link Stack 200 is Popped for the bclr[1] in step 121. If the correct Hint action in step 109 is Hint 3, then prediction is done with Count Cache 606 in step 120 and the Count Cache 606 and the Link Stack 200 are not updated in step 122.

Figure 2:
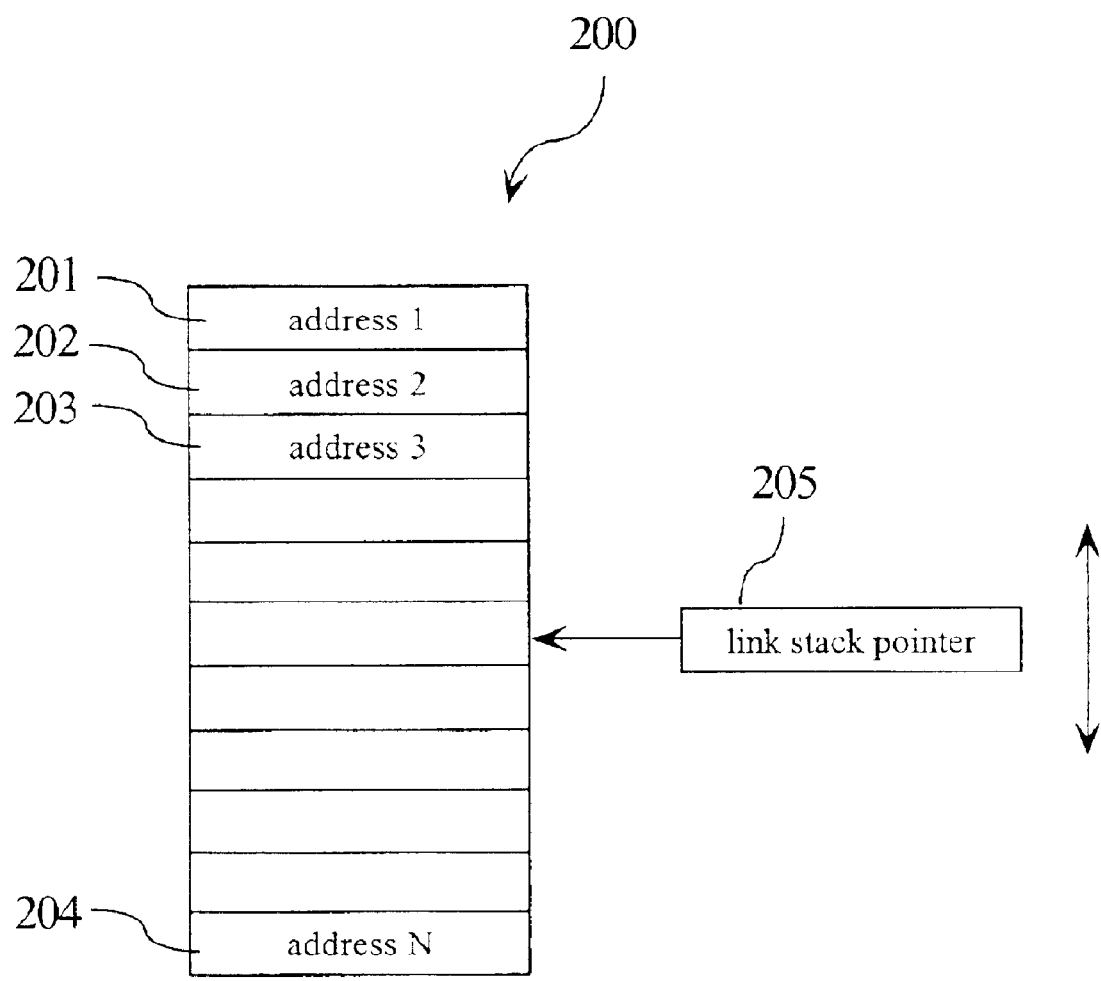
FIG. 2 illustrates a link stack register used in embodiments of the present invention.

FIG. 2 is a block diagram of a Link Stack 200. A Link Stack 200 is a shift register that may be accessed as a first in last out (FILO) or a last in first out (LIFO) mode. A Link Stack pointer 205 points to the top of the Link Stack 200. A new address may be "Pushed" or written into the Link Stack 200 by incrementing the Link Stack pointer 205 by one and writing the new address to the location pointed to by the Link Stack pointer 205. An address may be "Popped" or read from the Link Stack 200 by reading the entry pointed to by the Link Stack 200 and decrementing the Link Stack pointer 205 by one. Link Stack pointer 205 points within a particular a range of Link Stack 200 entries. If Link Stack 200 is an N-entry Link Stack, Link Stack pointer 205 has values which range between "0" and "N-1". If the Link Stack pointer 205 (for this example) is "N-1", a "Push" will cause Link Stack pointer 205 to be set to "0" and the new address to be written at entry "0". If Link Stack pointer 205 has a value of "0", a "Pop" will read the value of the Link Stack entry "0" and the Link Stack pointer 205 will be set to "N-1". The Link Stack 200 is used to manage branch addresses in "branch to link register" and "branch and link" instructions.

Figure 3:
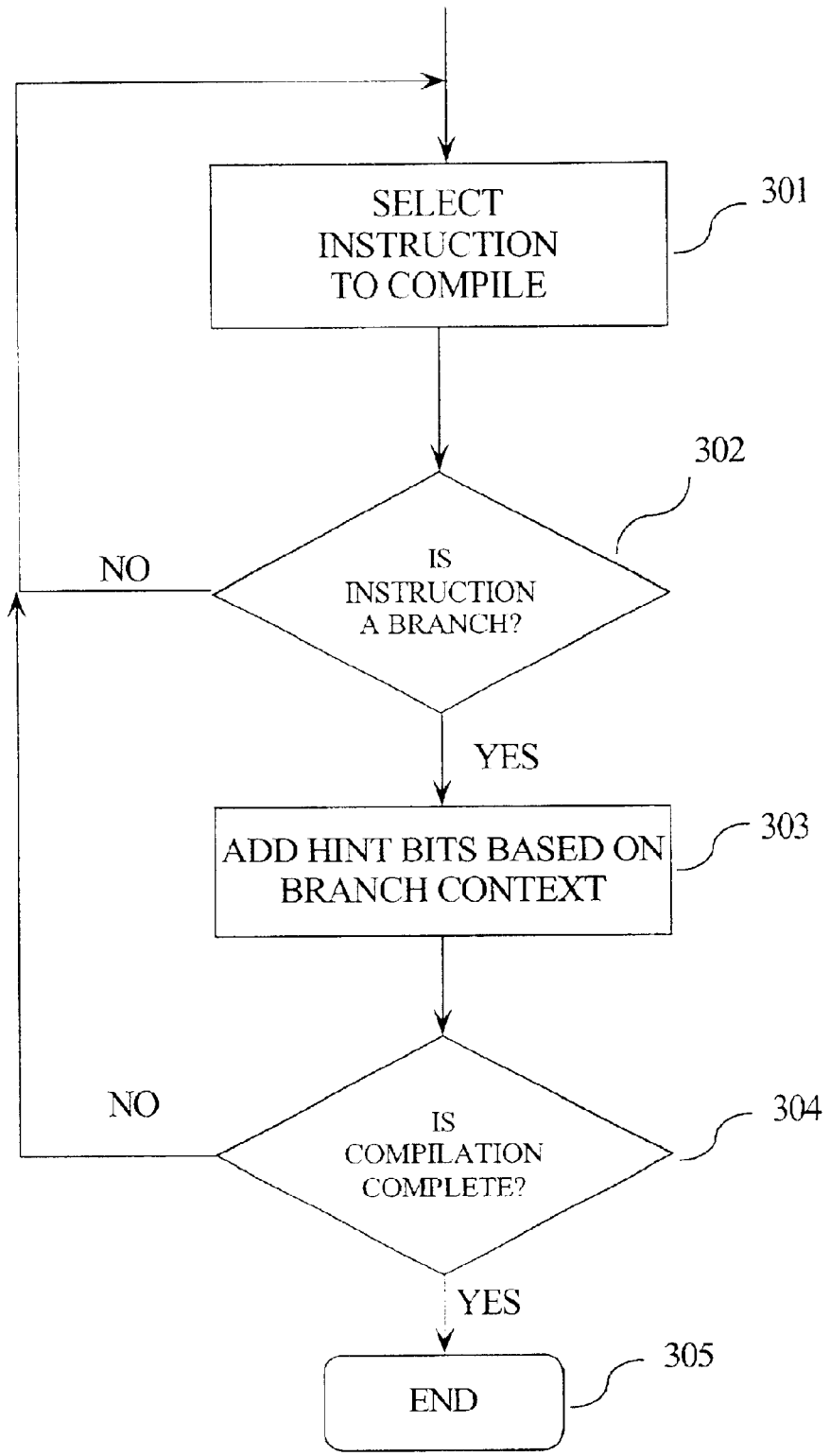
FIG. 3 is a flow diagram of steps in adding Hint bits during code compilation.

FIG. 3 is a flow diagram of code compilation where Hint bits are added to a branch instruction. In step 301, an instruction is selected to compile to machine code. In step 302, a test is made to determine if the instruction is a branch instruction. If the result of the test in step 302 is NO, then a return to step 301 is initiated to select another instruction to compile. If the result of the test in step 302 is YES, the Hint bits are added to the branch instruction based on the branch instruction context in step 303. A test is made in step 304 to determine if the compilation is complete. If the result of the test in step 304 is No, then a branch to step 301 is initiated selecting a new instruction to be compiled. If the result of the test in step 304 is YES, then compilation is ended in step 305.

Figure 5:
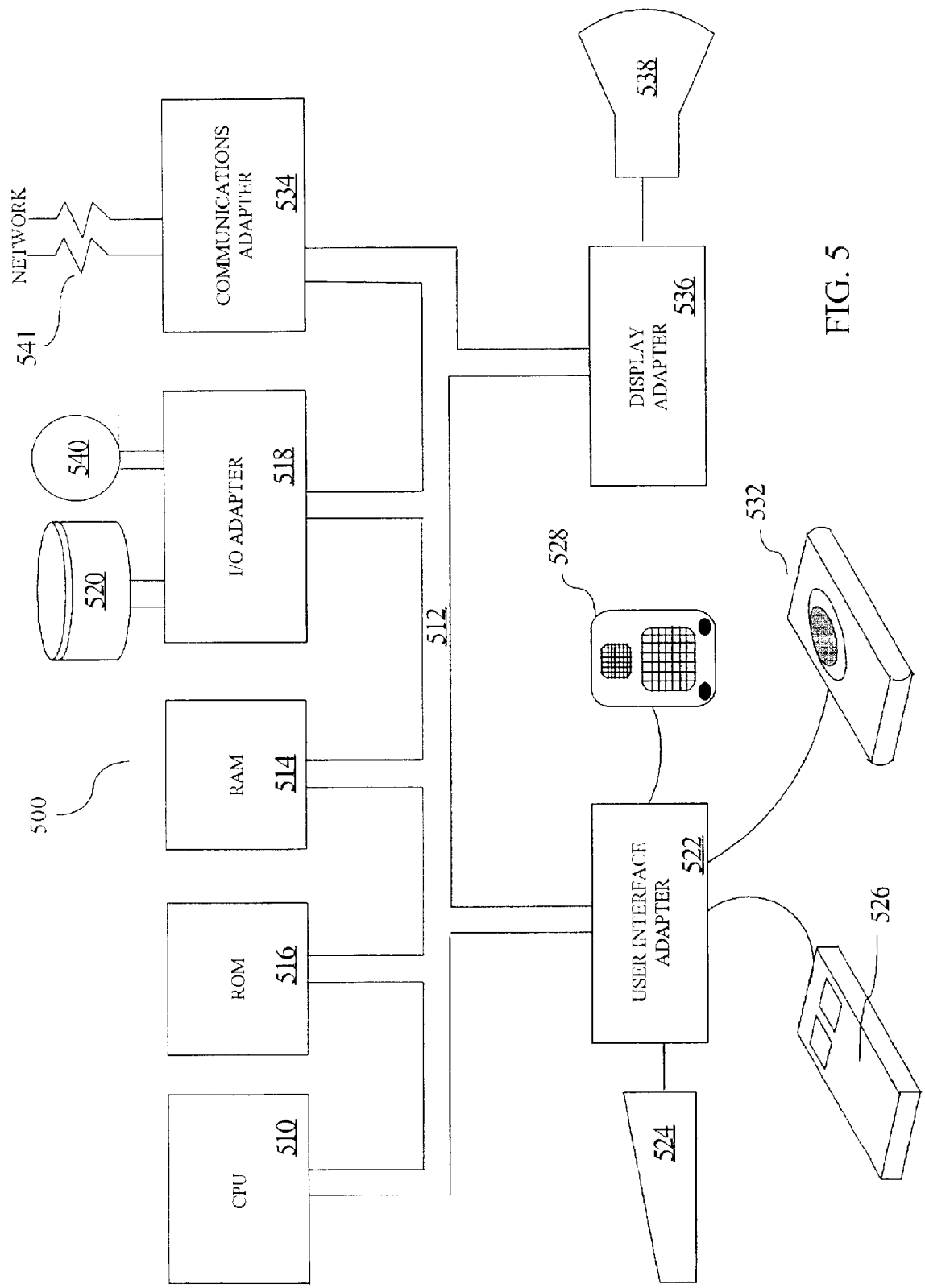
FIG. 5 is a block diagram of a data processing system employing a CPU that may use embodiments of the present invention.

FIG. 5 is a high level functional block diagram of a representative data processing system 500 suitable for practicing the principles of the present invention. Processing system 500, includes a central processing system (CPU) 510 operating in conjunction with s system bus 512. CPU 510 may be, for example, a reduced instruction set computer (CISC). System bus 512 operates in accordance with a standard bus protocol, such that as the ISA protocol, compatible with CPU 510. CPU 510 operates in conjunction with read-only memory (ROM) 516 and random access memory (RAM) 514. Among other things, ROM 516 supports the Basic Input Output System (BIOS). For example RAM 514 includes, DRAM (Dynamic Random Access Memory) system memory and SRAM (Static Random Access Memory) external cache. I/O Adapter 518 allow for an interconnection between the devices on system bus 512 and external peripherals, such as mass storage devices (e.g., a hard drive , floppy drive or CD/ROM drive), or a printer. A peripheral device 520 is, for example, coupled to a peripheral control interface (PCI) bus, and I/O adapter 518 therefore may be a PCI bus bridge. User interface adapter 522 couples various user input devices, such as a keyboard 524, mouse 526, touch pad 532 or speaker 528 to the processing devices on bus 512. Display adapter 536 supports a display 538 which may be, for example, a cathode ray tube (CRT), liquid crystal display (LCD) or similar conventional display unit. Display adapter 536 may include among other things a conventional display controller and frame buffer memory. Data processing system 500 may be selectively coupled to a computer or communications network through communications adapter 534. Communications adapter 534 may include for example, a modem for connecting to a communications network and/or hardware and software for connecting to a computer network such as a local area network (LAN) or wide area network (WAN). CPU 510 may employ hardware and software that uses the software Hints according to embodiments of the present invention.

Although the present invention and its advantages have been described in detail, it should be understood that various changes, substitutions and alterations can be made herein without departing from the spirit and scope of the invention as defined by the appended claims.

What is claimed is:

1. A method for improving branch instruction target address prediction comprising the steps of:
   providing a predetermined Hint bit field within said branch instruction when said branch instruction is a branch to link register (baclr[1]) instruction or a branch to count register (bacctr[1]) instruction;
   storing Hint bits in said Hint bit field in response to a use of said branch instruction in a software routine;
   decoding said Hint bits when said branch instruction is subsequently speculatively executed; and
   executing a hardware action corresponding to said decoding of said Hint bits, wherein said step of executing said hardware action further comprises popping a link stack address from a link stack, predicting a branch target address using said link stack address for said branch to link register (bclr[1]), and not pushing a link register value into said link stack for said bclrl instruction in response to a first decode of said Hint bits.

2. The method of claim 1, wherein said step of executing said hardware action further comprises the steps of predicting said branch target address using an address from a Count Cache, updating said Count Cache, and pushing said link register value into said link stack for said bcctrl instruction in response to said first decode of said Hint bits.

3. The method of claim 1, wherein said step of executing said hardware action further comprises the steps of predicting said branch target address using said Count Cache, updating said Count Cache for both said branch to link register (bclr[1]) and said branch to count register (bcctr[1]) instruction, and pushing a link register value into said link stack for said bcctrl in response to a second decode of said Hint bits.

4. The method of claim 1, wherein said step of executing said hardware action further comprises the steps of predicting said branch address using a Count Cache and not updating said Count Cache or said link stack in response to a third decode of said Hint bits.

5. The method of claim 1, wherein said hardware action comprises predicting a branch target address using a Count Cache and popping said link stack for said branch to link register (bclr[1]) instruction in response to a fourth decode of said Hint bits.

6. A system for improving branch instruction target address prediction comprising:
   a Hint decode circuit operable to decode Hint bits in a branch instruction if said branch instruction is subsequently speculatively executed, wherein said branch instruction includes a branch to link register (bclr [1]) instruction or a branch to count register (bccr[1]) instruction; and
   a Hint hardware action circuit operable to execute a selected hardware action in response to selected states of said Hint bits in said branch instructions when said branch instruction is speculatively executed, wherein said hardware action circuit further comprises circuitry for popping a link stack address from a link stack, predicting a branch target address using said link stack address for said branch to link register (bclr[1]), and circuitry for not pushing a link register value into said link stack for said bclrl instruction in response to a first decode of said Hint bits.

7. The system of claim 6, wherein said hardware action circuit further comprises circuitry for predicting said branch target address using an address from a Count Cache, updating said Count Cache, and circuitry for pushing said link register value into said link stack for said bcctrl instruction in response to said first decode of said Hint bits.

8. The system of claim 6, wherein said hardware action circuit further comprises circuitry for predicting said branch target address using a Count Cache, updating said Count Cache for both said branch to link register (bclr[1]) and said branch to count register (bcctr[1]) instructions, and circuitry for pushing a link register value into said link stack for said bcctrl in response to a second decode of said Hint bits.

9. The system of claim 6, wherein said hardware action circuit further comprises circuitry for predicting said branch address using a Count Cache and circuitry for not updating said Count Cache or said link stack in response to a third decode of said Hint bits.

10. The system of claim 6, wherein said hardware action circuit further comprises circuitry for predicting a branch target address using a Count Cache and circuitry for popping said link stack for said branch to link register (bclr[1]) instruction in response to a fourth decode of said Hint bits.

11. A data processing system comprising:
   a central processing unit (CPU);
   shared random access memory (RAM);
   read only memory (ROM);
   an I/O adapter; and
   a bus system coupling said CPU to said ROM, said RAM said display adapter, wherein said CPU further comprises:
   a Hint decode circuit operable to decode Hint bits in a branch instruction if said branch instruction is subsequently speculatively executed, wherein said branch instruction includes a branch to link register (bclr[1]) instruction or a branch to count register (bcctr[1]) instruction; and
   a Hint hardware action circuit operable to execute a selected hardware action in response to selected states of said Hint bits in said branch instructions when said branch instructions are speculatively executed, wherein said hardware action circuit further comprises circuitry for popping a link stack address from a link stack, predicting a branch target address using said link stack address for said branch to link register (bclr[1]), and circuitry for not pushing a link register value into said link stack for said bclrl instruction in response to a first decode of said Hint bits.

12. The data processing system of claim 11, wherein said hardware action circuit further comprises circuitry for predicting said branch target address using a Count Cache, updating said Count Cache for both said branch to link register (bclr[1]) and said branch to count register (bcctr[1]) instruction, and circuitry for pushing a link register value into said link stack for said bcctrl in response to a second decode of said Hint bits.

13. The data processing system of claim 11, wherein said hardware action circuit further comprises circuitry for predicting said branch target address using a Count Cache, updating said Count Cache for both said branch to link register (bclr[1]) and said branch to count register (bcctr[1]) instructions, and circuitry for pushing a link register value into said link stack for said bcctrl in response to a second decode of said Hint bits.

14. The data processing system of claim 11, wherein said hardware action circuit further comprises circuitry for predicting said branch address using a Count Cache and circuitry for not updating said Count Cache or said link stack in response to a third decode of said Hint bits.

15. The data processing system of claim 11, wherein said hardware action circuit further comprises circuitry for predicting a branch target address using s Count Cache and circuitry for popping said link stack for said branch to link register (bclr[1]) instruction in response to a fourth decode of said Hint bits.

* * * * *

UNITED STATES PATENT AND TRADEMARK OFFICE
CERTIFICATE OF CORRECTION

PATENT NO. : 6,823,447 B2
DATED : November 23, 2004
INVENTOR(S) : Robert William Hay and Balaram Sinharoy It is certified that error appears in the above-identified patent and that said Letters Patent is hereby corrected as shown below:

Column 8,
Line 46, please replace "(baclr[l])" with -- (bclr[l]) --.
Line 47, please replace "(bacctr[l])" with -- (bcctr[l]) --.

Column 9,
Lines 1 and 4, please replace "said" with -- a --.
Line 4, please replace "instruction" with -- instructions --.
Line 23, please replace "(bccr[l])" with -- (bcctr[l]) --.
Line 28, please replace "instruction is" with -- instructions are --.

Column 10,
Line 9, please replace "said" with -- a --.
Line 51, please replace "s" with -- a --.

Signed and Sealed this

Tenth Day of May, 2005

JON W. DUDAS
*Director of the United States Patent and Trademark Office*